United States Patent
Miller et al.

(10) Patent No.: US 6,523,063 B1
(45) Date of Patent: Feb. 18, 2003

(54) METHOD SYSTEM AND PROGRAM PRODUCT FOR ACCESSING A FILE USING VALUES FROM A REDIRECT MESSAGE STRING FOR EACH CHANGE OF THE LINK IDENTIFIER

(75) Inventors: Graham Miller, San Francisco, CA (US); Michael Hanson, Menlo Park, CA (US); Brian Axe, San Francisco, CA (US); Steven Richard Evans, Los Altos Hills, CA (US)

(73) Assignee: Zaplet, Inc., Redwood Shores, CA (US)

(*) Notice: Subject to any disclaimer, the term of this patent is extended or adjusted under 35 U.S.C. 154(b) by 0 days.

(21) Appl. No.: 09/483,502

(22) Filed: Jan. 14, 2000

Related U.S. Application Data

(63) Continuation-in-part of application No. 09/427,152, filed on Oct. 25, 1999, and a continuation-in-part of application No. 09/426,648, filed on Oct. 25, 1999, now Pat. No. 6,463,461, and a continuation-in-part of application No. 09/427,378, filed on Oct. 25, 1999.
(60) Provisional application No. 60/151,650, filed on Aug. 31, 1999, and provisional application No. 60/151,476, filed on Aug. 30, 1999.

(51) Int. Cl.[7] .............................................. G06F 15/16
(52) U.S. Cl. ...................... 709/206; 709/204; 709/217; 709/219; 709/229; 709/235; 709/245
(58) Field of Search ................................ 709/204, 206, 709/217, 219, 229, 235, 245, 248

(56) References Cited

U.S. PATENT DOCUMENTS

| | | | |
|---|---|---|---|
| 4,503,499 A | 3/1985 | Mason et al. | ............... 364/200 |
| 4,567,600 A | 1/1986 | Massey et al. | ............... 375/2.1 |

(List continued on next page.)

FOREIGN PATENT DOCUMENTS

| | | |
|---|---|---|
| EP | 0 739 115 A2 | 10/1996 |
| EP | 0 959 592 A2 | 11/1999 |
| EP | 1 085 444 A2 | 3/2001 |

OTHER PUBLICATIONS

J. Palme, et al., "MIME Encapsulation of Aggregate Documents, Such As HTML (MHTML)," Mar. 1999, XP 002209393, pp. 1–28.

IBM Corp, IBM Technical Disclosure Bulletin, "Method for Managing Files Referenced in In–Basket Items," vol. 36, No. 07, Jul. 1993, p. 469.

S. Dharap et al., "Multi–user distributed specification environments for Z," Technical report, Pennsylvania State University (1992), pp. 1–29.

(List continued on next page.)

*Primary Examiner*—Saleh Najjar
(74) *Attorney, Agent, or Firm*—Hickman Palermo Truong & Becker LLP

(57) ABSTRACT

A method and system is described that can be used to reliably, efficiently, and securely transmit information in a communications network. The information can be static or dynamic content. A server is configured with logic to encode and decode a link identifier into, safe character sets that are recognizable to many known web browsers. A redirect process is used to limit the amount of communication with the database. This means that the load and the cost of system operation can be reduced.

32 Claims, 8 Drawing Sheets

U.S. PATENT DOCUMENTS

| | | |
|---|---|---|
| 4,645,873 A | 2/1987 | Chomet |
| 5,043,876 A | 8/1991 | Terry |
| 5,089,954 A | 2/1992 | Rago .......................... 395/600 |
| 5,093,901 A | 3/1992 | Cree et al. .................. 395/100 |
| 5,093,918 A | 3/1992 | Heyen et al. ............... 395/725 |
| 5,129,057 A | 7/1992 | Strope et al. ............... 395/161 |
| 5,161,214 A | 11/1992 | Addink et al. .............. 395/145 |
| 5,245,532 A | 9/1993 | Mourier ...................... 364/400 |
| 5,299,305 A | 3/1994 | Oomae et al. .............. 395/149 |
| 5,325,310 A | 6/1994 | Johnson et al. ............. 364/514 |
| 5,363,507 A | 11/1994 | Nakayama et al. |
| 5,377,354 A | 12/1994 | Scannell et al. ............ 395/650 |
| 5,392,400 A | 2/1995 | Berkowitz et al. |
| 5,408,470 A | 4/1995 | Rothrock et al. ............ 370/62 |
| 5,410,646 A | 4/1995 | Tondevold et al. ......... 395/149 |
| 5,418,908 A | 5/1995 | Keller et al. ................ 395/200 |
| 5,428,784 A | 6/1995 | Cahill, Jr. ................... 395/650 |
| 5,535,332 A | 7/1996 | Ishida |
| 5,537,142 A | 7/1996 | Fenouil |
| 5,555,426 A | 9/1996 | Johnson et al. ........ 395/200.15 |
| 5,557,723 A | 9/1996 | Holt et al. .................. 395/149 |
| 5,579,472 A | 11/1996 | Keyworth, II et al. ...... 395/326 |
| 5,592,626 A | 1/1997 | Papadimitriou et al. |
| 5,602,841 A * | 2/1997 | Lebizay et al. |
| 5,608,872 A * | 3/1997 | Schwartz et al. ........... 709/205 |
| 5,615,269 A | 3/1997 | Micali |
| 5,617,539 A | 4/1997 | Ludwig et al. |
| 5,632,018 A | 5/1997 | Otorii |
| 5,647,002 A | 7/1997 | Brunson ...................... 380/49 |
| 5,664,207 A | 9/1997 | Crumpler et al. |
| 5,687,317 A | 11/1997 | Hughes et al. ......... 395/200.03 |
| 5,689,642 A | 11/1997 | Harkins et al. ........ 395/200.04 |
| 5,692,125 A | 11/1997 | Schloss et al. .............. 395/209 |
| 5,732,400 A | 3/1998 | Mandler et al. |
| 5,744,670 A | 4/1998 | Motoyuki et al. .......... 585/320 |
| 5,757,669 A | 5/1998 | Christie et al. |
| 5,781,732 A | 7/1998 | Adams |
| 5,790,677 A | 8/1998 | Fox et al. |
| 5,794,207 A | 8/1998 | Walker et al. |
| 5,796,396 A | 8/1998 | Rich |
| 5,799,191 A | 8/1998 | Moriyasu et al. |
| 5,799,320 A | 8/1998 | Klug |
| 5,819,032 A | 10/1998 | de Vries et al. ......... 395/200.8 |
| 5,819,092 A | 10/1998 | Ferguson et al. ........... 395/701 |
| 5,819,274 A | 10/1998 | Jackson, Jr. ................. 707/10 |
| 5,821,925 A | 10/1998 | Carey et al. ................ 345/331 |
| 5,825,883 A | 10/1998 | Archibald et al. ............ 380/25 |
| 5,826,242 A | 10/1998 | Montulli ..................... 705/27 |
| 5,835,713 A | 11/1998 | Fitzpatrick et al. |
| 5,842,178 A | 11/1998 | Giovannoli |
| 5,848,396 A * | 12/1998 | Gerace |
| 5,850,430 A | 12/1998 | Hamalainen |
| 5,850,517 A | 12/1998 | Verkler et al. |
| 5,855,020 A | 12/1998 | Krisch ......................... 707/10 |
| 5,862,330 A | 1/1999 | Anupam et al. ....... 395/200.34 |
| 5,872,924 A | 2/1999 | Nakayama et al. |
| 5,884,035 A | 3/1999 | Butman et al. ........ 395/200.48 |
| 5,884,325 A | 3/1999 | Bauer et al. |
| 5,892,761 A | 4/1999 | Stracke, Jr. ................. 370/395 |
| 5,897,622 A | 4/1999 | Blinn et al. .................. 705/26 |
| 5,905,863 A | 5/1999 | Knowles et al. |
| 5,909,689 A | 6/1999 | Van Ryzin |
| 5,911,045 A | 6/1999 | Leyba et al. |
| 5,913,040 A | 6/1999 | Rakavy et al. |
| 5,913,920 A | 6/1999 | Adams et al. |
| 5,918,054 A | 6/1999 | Jury et al. ................... 395/712 |
| 5,923,848 A * | 7/1999 | Goodhand et al. .......... 709/219 |
| 5,930,471 A | 7/1999 | Milewski et al. |
| 5,933,811 A | 8/1999 | Angles et al. |
| 5,937,161 A | 8/1999 | Mulligan et al. |
| 5,944,785 A | 8/1999 | Pommier et al. |
| 5,945,989 A | 8/1999 | Freishtat et al. ............ 345/329 |
| 5,948,057 A | 9/1999 | Berger et al. |
| 5,948,070 A | 9/1999 | Fujita |
| 5,951,652 A * | 9/1999 | Ingrassia, Jr. et al. ...... 709/248 |
| 5,956,693 A | 9/1999 | Geerlings |
| 5,960,404 A | 9/1999 | Chaar et al. .................... 705/8 |
| 5,963,947 A | 10/1999 | Ford et al. |
| 5,966,512 A | 10/1999 | Bates et al. |
| 5,970,479 A | 10/1999 | Shepherd |
| 5,974,430 A | 10/1999 | Mutschler, III et al. .... 707/505 |
| 5,978,836 A | 11/1999 | Ouchi |
| 5,987,376 A | 11/1999 | Olson et al. |
| 5,987,523 A * | 11/1999 | Hind et al. .................. 709/245 |
| 5,995,096 A | 11/1999 | Kitahara et al. |
| 5,995,097 A | 11/1999 | Tokumine et al. |
| 6,006,200 A | 12/1999 | Boies et al. |
| 6,009,410 A * | 12/1999 | LeMole et al. |
| 6,012,083 A | 1/2000 | Savitzky et al. |
| 6,012,090 A | 1/2000 | Chung et al. |
| 6,014,502 A | 1/2000 | Moraes .................. 395/200.49 |
| 6,014,644 A | 1/2000 | Erickson |
| 6,014,688 A | 1/2000 | Venkatraman et al. |
| 6,023,686 A | 2/2000 | Brown |
| 6,025,841 A | 2/2000 | Finkelstein et al. ......... 345/342 |
| 6,041,308 A | 3/2000 | Walker et al. |
| 6,044,205 A | 3/2000 | Reed et al. ............ 395/200.31 |
| 6,044,403 A | 3/2000 | Gerszberg et al. |
| 6,047,311 A | 4/2000 | Ueno et al. ................. 709/202 |
| 6,049,787 A | 4/2000 | Takahashi et al. |
| 6,055,519 A | 4/2000 | Kennedy et al. |
| 6,055,522 A | 4/2000 | Krishna et al. ............. 705/517 |
| 6,084,883 A | 7/2000 | Norrell et al. |
| 6,092,074 A | 7/2000 | Rodkin et al. |
| 6,105,055 A | 8/2000 | Pizano et al. ............... 709/204 |
| 6,115,384 A | 9/2000 | Parzych |
| 6,134,582 A | 10/2000 | Kennedy ..................... 709/206 |
| 6,141,010 A * | 10/2000 | Hoyle ......................... 345/356 |
| 6,144,991 A | 11/2000 | England ...................... 709/205 |
| 6,151,621 A | 11/2000 | Colyer et al. ............... 709/204 |
| 6,155,840 A * | 12/2000 | Sallette ........................ 434/323 |
| 6,161,137 A | 12/2000 | Ogdon et al. ............... 709/224 |
| 6,161,149 A | 12/2000 | Achacoso et al. ............. 710/4 |
| 6,173,316 B1 | 1/2001 | De Boor et al. ............ 709/218 |
| 6,182,052 B1 | 1/2001 | Fulton et al. ................. 705/26 |
| 6,185,602 B1 | 2/2001 | Bayrakeri .................... 709/204 |
| 6,205,478 B1 | 3/2001 | Sugano et al. .............. 709/223 |
| 6,212,553 B1 | 4/2001 | Lee et al. .................... 709/206 |
| 6,219,054 B1 | 4/2001 | Komoda et al. ............ 345/353 |
| 6,226,670 B1 | 5/2001 | Ueno et al. ................. 709/207 |
| 6,230,156 B1 | 5/2001 | Hussey ......................... 707/10 |
| 6,230,185 B1 | 5/2001 | Salas et al. .................. 709/205 |
| 6,247,045 B1 | 6/2001 | Shaw et al. ................. 709/207 |
| 6,260,124 B1 | 7/2001 | Crockett et al. ............ 711/162 |
| 6,289,333 B1 * | 9/2001 | Jawahar et al. ................ 707/2 |
| 6,298,356 B1 * | 10/2001 | Jawahar et al. ............. 707/201 |
| 6,317,777 B1 | 11/2001 | Skarbo et al. ............... 709/204 |
| 6,336,134 B1 | 1/2002 | Varma ......................... 709/205 |
| 6,338,086 B1 | 1/2002 | Curtis et al. ................ 709/218 |

OTHER PUBLICATIONS

S. Dharap et al., "The Z–Specificator: A multi–user distributed specification environment," Technical report, Pennsylvania State University (1992), pp. 1–26.

S. Dharap, "Coordinating Concurrent Development in Distributed Environments," Ph.D. thesis, Pennsylvania State University Department of Computer Science (May, 1995), pp. 1–98.

"Lotus Notes 5 Releasestep by Step, a Beginner's Guide to Lotus Notes," 1995–1999, pp. 1–228.

"Quick Courses in Microsoft Outlook 2000," Microsoft Press, Online Press Inc., 1999, pp. 1–148.

Goldberg et al., *Active Mail–A Framework for Implementing Groupware* CSWC Proceedings Nov. 1992: 75–83.

Brothers et al., *Supporting Informal Communication Via Ephemeral Interest Groups* CSWC Proceedings Nov. 1992: 84–90.

Borenstein, Nathaniel S., *Computational Mail as Network Infrastructure for Computer–Supported Cooperative Work* CSWC Proceedings Nov. 1992: 67–74.

\* cited by examiner

METHOD SYSTEM AND PROGRAM PRODUCT FOR ACCESSING A FILE USING VALUES FROM A REDIRECT MESSAGE STRING FOR EACH CHANGE OF THE LINK IDENTIFIER

PROVISIONAL APPLICATION DATA

The present invention claims priority to U.S. Provisional Patent Application Nos. 60/151,650, filed Aug. 31, 1999 and 60/151,476, filed Aug. 30, 1999, both entitled SYSTEMS AND METHODS FOR MESSAGING WITH DYNAMIC CONTENT, naming inventors Michael Hanson, Graham Miller, and Brian Axe, and is incorporated by reference as if fully set forth herein.

CROSS-REFERENCE TO RELATED APPLICATIONS

The present application is a continuation-in-part application of co-pending U.S. patent application Nos. 09/427,152 entitled METHOD FOR COMMUNICATING INFORMATION AMONG A GROUP OF PARTICIPANTS, filed Oct. 25, 1999 percent pending; 09/426,648 entitled SYSTEM FOR COMMUNICATING INFORMATION AMONG A GROUP OF PARTICIPANTS, filed Oct. 25, 1999 now U.S. Pat. Nos. 6,463,461; and 09/427,378 entitled ELECTRONIC MEDIA FOR COMMUNICATING INFORMATION AMONG A GROUP OF PARTICIPANTS, filed Oct. 25, 1999; invented by Michael Hanson, Graham Miller, and Brian Axe; and such applications are incorporated by reference herein as if fully set forth herein.

TECHNICAL FIELD

The present invention relates generally to the transmission of information over communication networks, and more particularly, to a method and system for transmitting such information more efficiently by encoding and decoding link identifiers into safe character sets associated with the information over such networks.

BACKGROUND

Communication networks, such as the Internet, have become a common medium to transmit information to users of these networks. As such, many attempts have been made to provide reliable, secure, and efficient transmission of information over the network.

Generally, the information is transmitted in the form of files that are attached to a message, such as an electronic mail message. The files are retrieved from a repository, such as a database, when requested or sent by a user. A simple transmission scheme that is used by many electronic mail systems is Base64 encoding. For this type of encoding, binary content, such as images, is encoded and attached as text to the message.

Base64 encoding has certain drawbacks. Base64 encoding only supports static content. This means that the content must be completely defined before the transmission. Additionally, Base64 encoding is expensive. This is because each intermediate system in the network, such as a server located between users of the network, requires that a storage and transmission cost be paid, even if the information is not decoded for use. Further, all of the data must be transmitted each time a version or copy of the information is requested. This substantially increases the load on the network of servers that distribute the content. As a result, the number of messages that can be transmitted and stored is reduced.

Another technique for transmitting information is to use a client-server system in the network. In this case, only the location of the information in the database is transmitted to the client, e.g., a user's desktop computer. The location can be identified using a link identifier, such as a Universal Resource Locator ("URL"). When the client receives the message, the client then requests the file from the database via the server. This system provides no efficient method of providing dynamic or personalized data to the end-user because every client receives the identifier of a single server file.

More recently, arguments associated with a file of information in the network have been encoded in the link identifier. This provides a simple form of Remote Method Invocation (RMI), which is the invocation of application code on a remote machine by a client. When the server receives a request for the file identified by the link identifier, it executes application code, which decodes the arguments and optionally accesses a database of content. This means that communications to and the load on the database can be reduced. However, because certain encoders and decoders can only support a certain number of characters for a given link identifier the number and size of arguments that are specified in the link identifier are limited. This means that the details that can be used to describe the information using the characters must be abbreviated. This makes supporting complex binary content, such as an image With multiple colors and backgrounds, difficult. To support this complex content, additional configuration of the network software and hardware may be required. This can increase the expense and limit the operation of the system.

Another drawback to the above known transmission techniques and schemes is that values in the link identifier that are represented by characters, such as date and time values and the location of the file, often change. Since the encoded characters are fixed when the message or information is sent, any changes or modifications to the content can only be sent to the client by re-generating the entire content for each new request. This means that the client cannot cache the content. This causes the information to only be stored in the database or remote server, and thus causes the server and network load to increase.

SUMMARY

In general, the present invention is directed to a system and method for transmitting information over a network. The preferred method and system encodes a link identifier, such as a URL, that is associated With a then current dynamic content of an electronic medium that is stored in a server. A redirection process is used to create a redirection message string that can be easily cached and that limits the load on the system by accessing only changed states of the information represented by the link identifier, not the entire set of information. For each new request for information by any of the participants, the redirect message string can be used to direct the participant to the server.

Accordingly, in one aspect, the present invention is directed to a method for transmitting information over a network that includes receiving a link identifier associated with a file containing the information. A first command may be executed to retrieve the link identifier and the link identifier may be converted to a property set. The method may also include encoding the property set and generating a redirect message string from the property set. The file may be accessed using values from the redirect message string for each change of the link identifier.

Implementations of the invention may include one or more of the following. The information may include static or binary content. The link identifier may be transmitted to a participant using an electronic message, and the electronic message may be parsed to generate a current state of the link identifier as an image description from a message-ID in the link identifier. The electronic message may be an HTML encoded message. The property set may be encoded using ASCII-based encoding. The property string may be compressed and obscured. The property string may be mapped into a set of safe character values. An image may be generated from values contained in the redirect message string. The link identifier may be configured for use with an electronic mail or Internet protocol.

In another aspect, the present invention is directed to a method for transmitting information over a network that includes receiving a link identifier in an electronic message. The link identifier may be associated with a file containing the information. The method further includes parsing the electronic message and executing a first command to retrieve the link identifier. The link identifier may be converted to a property set, and the property set may be encoded into a safe character set. A redirect message string may be generated from the property set, and the file may be accessed using values from the redirect message string for each change of the link identifier.

In a further aspect, the present invention is directed to a network system for transmitting information among a group of participants that includes a server for generating and sending a link identifier associated with the file containing the information to a participant. The server may further include an interface responsive to a first command to retrieve the link identifier. A web application server may be used to convert the link identifier to a property set and logic in the web application server may be used to encode the property set and to generate a redirect message from the property set. An image server may be used to access the file using values from the redirect message string for each change of the link identifier.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
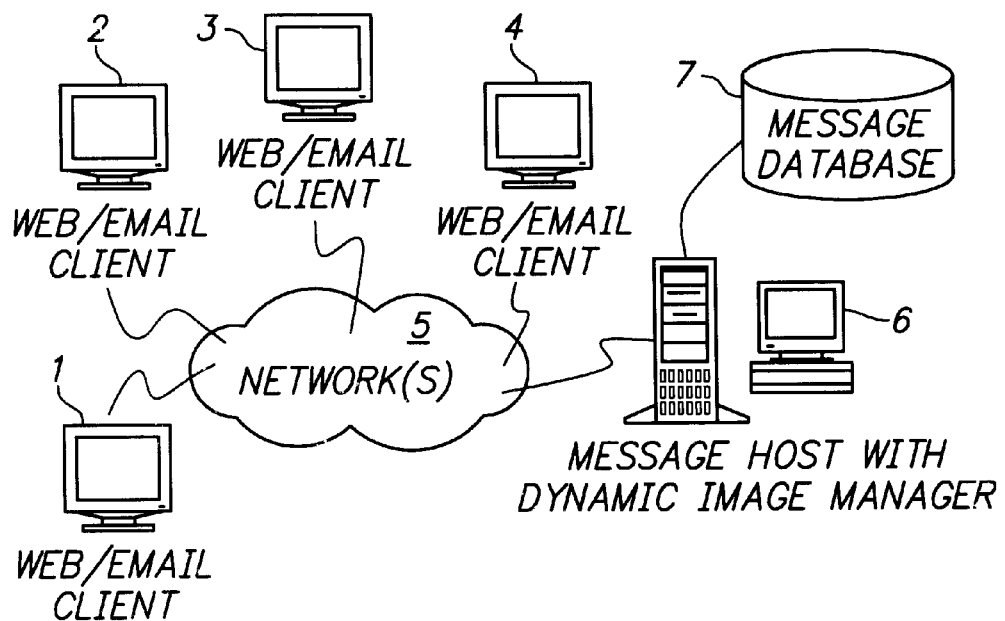
FIG. 1 is a simplified diagram of a sample network including participants of a group connected to the network.

In general, the present invention is directed to a method and system for communicating and collaborating among participants in a group. The method uses an electronic medium having at least one dynamic content region that is stored in a database of a server. Input composed by the participants of the group or other external sources is accepted by the server to update the dynamic content region of the electronic medium in the server. The updating of the dynamic content region is preferably performed asynchronously relative to the sending and receiving of the input from any of the participants or external sources. In this way, the content of the electronic medium is always current.

The invention is based on a principle different from known communication systems i.e. the information communicated between participants of the group is not current when sent by any participant, but current when accessed or read by a participant. The method and system of the invention does not merely rely on sending information that was current when the medium was sent to a receiving participant to communicate information; rather, the current content from the server of the electronic medium is retrieved, when the receiving participant accesses the electronic medium. This means that multiple virtual instances of the electronic medium can be reduced to a single thread. The method and system usefully reduces the amount of media, such as electronic mail messages carrying redundant static content that is communicated among the participants of the group. This invention also makes collaboration of information more rapid and interactive among participants of the group.

The electronic medium can also be updated by a variety of external sources, such as by an attached server containing stock quotes or news feeds. In this way, the electronic medium can be used to supply different types of information to the participant in a fast, efficient, and flexible manner.

A suitable system for the invention is a communication network that is configured with participants that support a variety of protocols, such as those for supporting electronic mail ("e-mail") and the Internet. The electronic media for communicating information and that supports collaboration among participants in a group connected to the network will be referred to as a "zaplet". The zaplet contains static content and dynamic content regions. The term dynamic content can be defined as regions of the zaplet that are retrieved from the server, when the zaplet is accessed by a participant or external source. The term static content can be defined as regions of the zaplet that are not retrieved at the time the zaplet is accessed by a participant or external source. The dynamic content of the zaplet can be changed and updated by the participants in the group or by other external sources, such as an external server containing the most recent news feeds or stock quotes. The content of the zaplet can be stored in a database in a server of the network. The zaplet is also customizable and programmable, containing various text and graphical regions to execute a variety of functions and applications. Preferably, each of the regions may be configured by the participants or the server in the network. When a participant performs an open action to access the zaplet, the zaplet may open and the server serves and displays the then current content in the database to a participant.

An "open action" can be defined as an action by any of the participants or the server that causes the static and/or the dynamic content of the zaplet to be retrieved from the server.

For example, an open action may occur when a user invokes the File Open command from a menu bar within an email reading program while an email message containing a zaplet is selected. Alternatively, the server could perform an open action using, for example, push technology processes.

The term collaboration can be defined as an activity in which one or more participants or services share information or points-of-view with an intent of reaching a decision, making a choice, conducting a financial transaction, or sharing knowledge.

The dynamic content can be represented in a dynamic content region in the zaplet, and includes text or images, such as rich text HTML, based on mark-up languages or image construction languages. Consequently, the zaplet can supply all the look and feel possibilities of the World Wide Web ("Web"), and also the participants can experience interactions and collaborate with each other with increased efficiently than in known e-mail systems.

The system and method of the invention makes communication among a group of participants simple. Preferably, the server used to generate and manage the zaplet is scalable for a particular implementation. Its scalability allows quick user response under heavy load conditions on the server. Further, the zaplet can be easily accessed by the participant, such as from a desktop computer. Accordingly, the participant will have constant access to his or her zaplet at all times, and thereby can collaborate with other participants in the group quickly, simply, and efficiently. This means that the participant needs not repeatedly type-in the URL of a portal web site to regain access toga particular application, such as a discussion; the zaplet may be easily accessible and open in an unobtrusive manner.

Unless otherwise defined, all technical and scientific terms used herein have substantially the same meaning as commonly understood by one of ordinary skill in the art to which the invention belongs. Although many methods and systems similar or equivalent to those described herein can be used in the practice of the present invention, suitable-methods and systems are described below. Additionally, the methods, systems, and examples described herein are illustrative only and not intended to be limiting.

Other features and advantages of the invention will be apparent from the following detailed description, the drawings, and from the claims.

FIG. 1 illustrates a plurality of participants 1, 2, 3, and 4 of a group that are coupled to a network 5. Any number of participants may be connected to the network 5. The term participant can be defined as an entity or system that is capable of performing or executing a variety of functions on the zaplet as described herein. For simplicity, however, the following description will be made to participants 1–4. Each of the participants 1–4 may include any specific or general computer system that is equipped to receive or read e-mail messages using standard e-mail protocols such as the Simple Mail Transfer Protocol (SMTP) and the Multipurpose Internet Mail Extensions (MIME), or navigate the Web. The computer may be, for example, a personal computer ("P.C."), an Apple Macintosh, a Unix workstation, or other computing machine that runs a windows-based operating system. A suitable computer may also include a modem, a monitor, a keyboard, a mouse, system software including support for TCP/IP communication, and browser software. Alternatively, the participants 1–4 may include other devices that are capable of transmitting or receiving e-mail messages, forms, or zaplets, such as Palm computers provided by 3Com Corporation, Windows CE-based devices, messaging enabled cellular telephones, pagers, television set top boxes, e.g., Web T.V., or portable computers. The participants 1–4 may further include other devices that are capable of processing text or voice messaging.

The network 5 may be any local or global computer network. For example, the network 5 may be the Internet, a telephone network, a wireless communications network, a satellite communications network, or other similar data networks.

For simplicity, the following description will be made using a system and method configured to support any of the below listed e-mail protocols and data structures. However, the invention can be configured and practiced in any of the above communication networks. For example, voice mail using interactive voice systems could be configured to provide voice messages as current when heard dynamic content.

Each of the participants 1–4 is configured to support a variety of e-mail protocols and mark-up languages, such as SMTP, MIME, Hypertext Mark-up Language ("HTML"), Extensible Mark-up Language ("XML"), Standardized Generalized. Mark-up Language ("SGML"), or similar e-mail protocols and/or mark-up languages.

FIG. 1 also shows a server 6 that is connected to the network 5. The server 6 is preferably configured to manage the dynamic content, routing, and updating of electronic forms, messages, or zaplets among the participants 1–4. The server 6.is connected to a message database 7 that is used to manage the dynamic content of zaplets in accordance with the present invention. Other data management resources may also be used.

Figure 2:
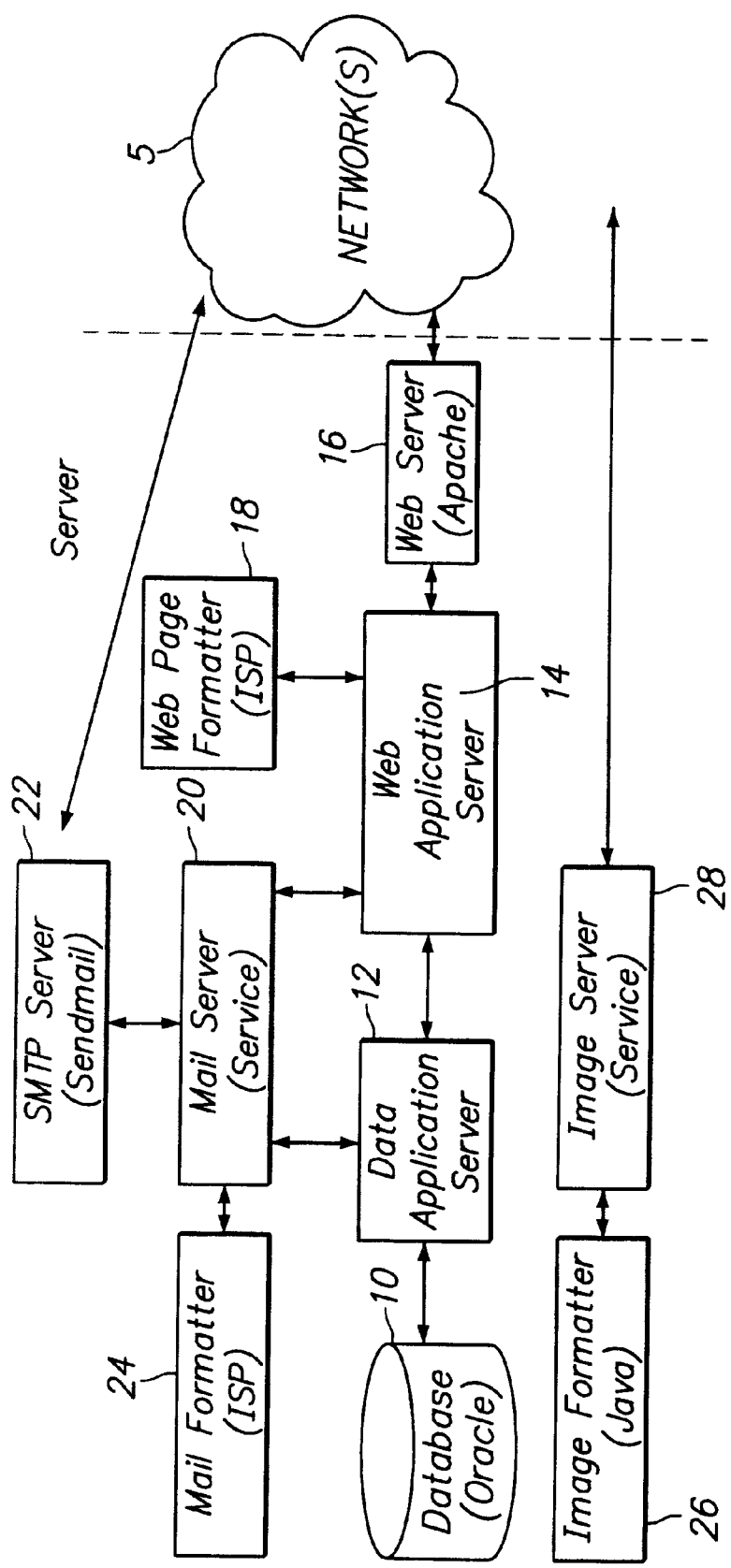
FIG. 2 illustrates a schematic diagram showing data flows of functional components of the network of FIG. 1.

FIG. 2 illustrates a simplified block diagram showing data flows of various functional components of the server 6. The server 6 includes a database 10. The database 10 may be a relational database, such as commercially available from Oracle. The database 10 may include multiple physical databases and may be implemented at a single site or distributed among many sites. The database 10 may also be implemented using object-oriented databases, object-relational databases, or.hierarchical file structures.

The database 10 may include information that is specific to any participant or electronic form, message, or zaplet. Contents of the database 10 may include demographic. data, participant credit card and payment information, participant preference information, generic form, message, or zaplet information, such as recipients or senders of the group, subject identifiers, or message specific information, and usage statistics for the electronic forms, messages, and zaplets and/or a web site. The database 10 may also store electronic forms that act as blanks for the creation of the zaplets. The database 10 may also include images and web pages used in the creation of the zaplets and also used in the presentation of any dynamic region of the zaplet. The database 10 may also maintain a record of the history of changes that have been made to any dynamic content region of the zaplet discussed below. This record may also be propagated along with any dynamic content to one of the participants parsing the electronic message and zaplet, as discussed below. An example configuration for storing and processing various content in the database 10 is illustrated in the attached Appendix A, which is herein incorporated by reference.

FIG. 2 also shows a data application server 12 is coupled to the database 10. The server 12 is configured with, for example, a set of Java classes or any other high level programming language built using, for example, an Enhydra application server or any of a variety of other tools for object-relational translation. The data application server 12 is used for translating the content in the database 10 into Java objects, for use by a web application server 14. The data application server 12 may also be configured to cache some data to reduce the load on the database 10.

A web server 16 is included in the server 6 to connect to the participants 1–4. The web server 16 is connected to the web application server 14 and can be any commercially available web server, such as an Apache server. The web server 16 is configured to manage requests from browsers at the participants 1–4, to manage session information, to send and receive forms, or zaplets transmitted to or from the participants 1–4, and to serve HTML data and static images to the participants 1–4.

The web application server 14 can be configured using a set of Java classes built-on top of the data application server 12. The web application server 14 is responsible for executing business logic associated with the electronic forms, messages, and zaplets. For example, the web application server 14 may manage message, form, and zaplet manipulation, deadlocks in the network 5, generate a URL and content associated with a specific zaplet or form, format the zaplet, message, or form, handle message authorizing, and handle participant record editing and participant interaction with various zaplets, forms, and messages.

A web page formatter 18 is connected to the web application server 14. The web page formatter 18 is used to handle the basic styles and layouts of various components of the zaplets, messages, or forms. Further details of the preferred business logic configured in pseudocode executable by the system and describing the method of the present invention for initiating, sending, updating and displaying the zaplet, forms, and messages can be found in attached Appendix A.

The web page formatter 18 may be configured to operate using a Java Server Page ("JSP") construct.

FIG. 2 also shows that the server 6 includes a mail server 20 coupled to the web application server 14 and the data application server 12. The mail server 20 handles the operations of the e-mail protocol necessary to support a variety of zaplets, forms, and messages. For a given message, form, or zaplet, the mail server 20 retrieves data associated with the medium from the data application server 12, and from any operations of the business logic of the web application server 14. The mail server 20 then formats the static content for the medium utilizing an associated mail formatter 24 including a command to retrieve the dynamic content. The mail formatter 24 includes operations that can be used for the basic styles and layouts of the common elements of the zaplets, forms, or messages. Once the mail server 20 has compiled the required information from the data application server 12 and web application server 14, the mail server 20 may attach necessary header information to the zaplet, form, or message. For example, the header information may make an e-mail message compliant with the MIME standard. The mail server 20 then transmits the produced message to a mail transport server 22. The mail transport server 22 routes the message through the network 5. The mail server 20 may also be configured to manage bounced and undelivered messages, forms, or zaplets, and also alert the appropriate participants of these conditions. The mail server 20 may also communicate with the web application server to validate the addresses of the various participants. The mail server 20 may also receive responses via the interaction region 225 discussed below from any participant who is not connected to the network 10 or "off-line" when reading the zaplet. In this configuration, the participant can send input back to the server 6 to be dynamically updated, after he or she is re-connected to the network 10. In this way, the participant can contribute to a zaplet even in the absence of the dynamic content and without having to get back to the zaplet when connected "on-line".

The mail formatter 24 may be implemented using a JSP construct.

The mail transport server 22 may use SMTP, and can be implemented using a number of commercially available or open source e-mail servers, including Sendmail and the Exchange server.

The server 6 also includes an image server 28 that is used for connection to the participants 1–4. An image formatter 26 is connected to the image server 28. The image server 28 may be implemented using a web server (servlet). The image server 28 takes information from Hypertext Transfer Protocol ("HTTP") requests from the participants 1–4 and translates the information using predefined schemes into human viewable images that are encoded in a format compatible with known web browsers. The image server 28 may be configured separately from the web server 16, as shown in FIG. 2. This configuration may increase the scalability of the server 6. Alternatively, the web server 16 and the image server 28 can be configured together. The image formatter 28 may be configured using a Java construct. The image formatter 28 formats the image into a compliant standard, such as Graphical Interchange Format ("GIF"), Joint Photographics Experts Group ("JPEG"), or Portable Network Graphics ("PNG"), for the participants 1–4.

Figure 3:
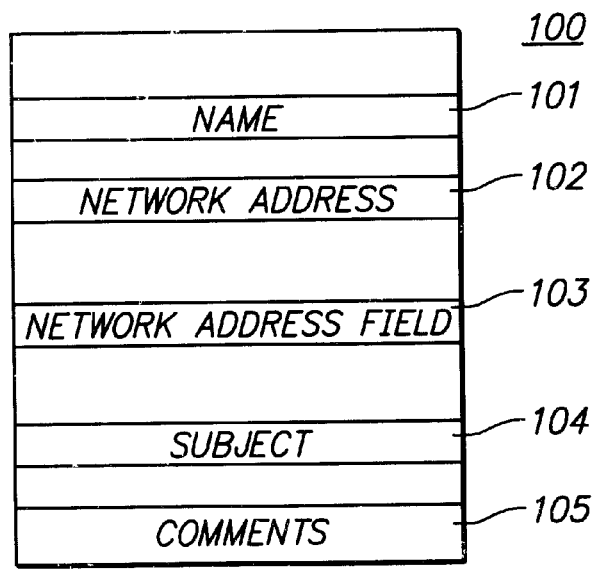
FIG. 3 illustrates an example electronic form to initiate a zaplet.

FIG. 3 illustrates an exemplary electronic form 100 that can be used to compose and initiate a zaplet among the participants 1–4 in accordance with the invention. The electronic form may be, for example, an HTML form. The electronic form 100 can be accessed via a web site sent by the server 6 to the participants 1–4, or may reside as a template at the participants 1–4.

The electronic form 100 can be stored in database 10, reside on a device of a participant, such as in a memory of a computer, or can be sent to a participant via a communications protocol, such as e-mail. The electronic form 100 may be blank or partially completed. To partially complete the form, the server 6 may contain prior knowledge of the use of the form using, for example, "cookies" or other suitable techniques.

The electronic form 100 includes a name field 101 that specifies the creating participant's name and a network address field 102 that specifies a specific address associated with the creating participant, such as an e-mail address. The electronic form 100 can also include a network address field 103 that includes network addresses of the participants that should receive the zaplet. The list of network addresses in the field 103 may include the network address of the creating participant. The list of network addresses may be explicitly inputted by the creating participant using a keyboard, imported from a folder or other file residing at the creating participant, or imported by the creating participant from a peripheral device, such as a Palm Pilot provided by 3Com. Alternatively, the creating participant can provide the list of network addresses to the server 6. In this configuration, the server 6 may input the list of network addresses into the field 103, when the creating participant accesses the electronic form 100, as described below. This means that the field 103 will be completed for the creating participant, when the electronic form 100 is accessed. At this stage, the creating participant may add or delete network addresses from the list provided by the server 6.

The electronic form 100 may also include a subject field 104 and any number of question, choice or comment fields 105. The creating participant may describe the subject matter of the zaplet in the subject filed 104 and supply details regarding the zaplet, in the comment field 105. In one configuration, each of the fields 101, 102, 103, 104, and 105 are part of a static region. The electronic form 100 may also include other applicable fields, such as for a title of the zaplet, fields for soliciting information from the participant, such as his/her address, links to other zaplets, a description field to receive an input, such as a URL, an image or binary data field, or option fields to specify choices, such as a poll choice.

The electronic form 100 can be used to initiate a variety of zaplets for different applications, which are herein referred to as "zaplet processes". Once the electronic form 100 is created, it is sent to the server 6. The server 6 then sends an e-mail message to the participants listed in the network address field 103 to notify the receiving participants that a zaplet process has been initiated. The e-mail message is opened and parsed, and the zaplet is essentially immediately accessed from the server 6 as described below.

Figure 4:
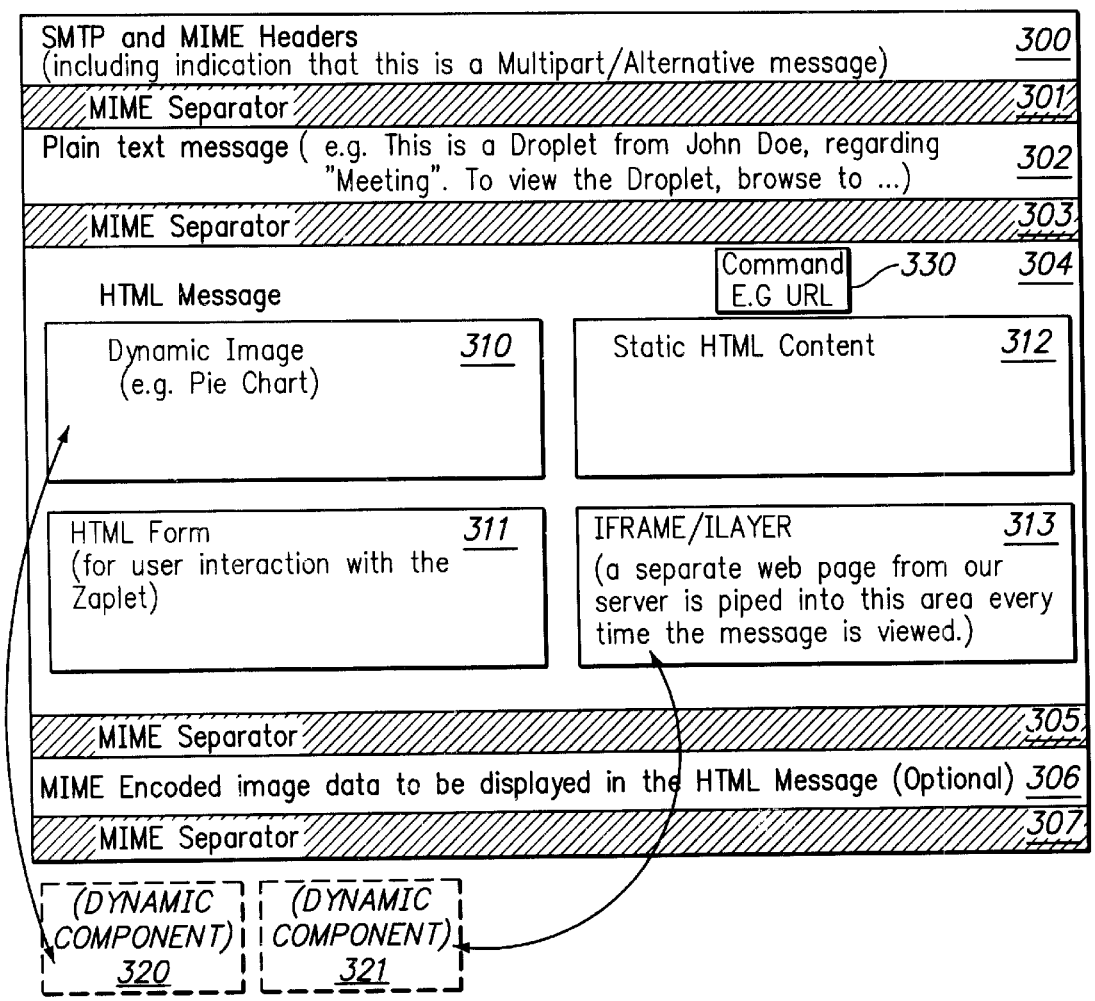
FIG. 4 is a diagram of a data structure for the zaplet having dynamic content.

FIG. 4 shows a suitable data structure for a zaplet process in accordance with the invention.

The data structure 350 can be based, for example, on HTML over SMTP using MIME. The data structure 200 includes SMTP and MIME headers 300. These headers 300 include an indication that the message is a multipart/alternative type according to the MIME standard. The multipart/alternative type specifies that the participant is configured to display one alternative format or content-type of the message selected from a segment 302 and a segment 304, depending on the capability of the software of the participant parsing the message.

The data structure 350 may define a transport envelope with region 300 containing a plurality of network addresses, such as the e-mail address of a sending and receiving participant.

A MIME separator 301 may be inserted between headers 300 and segments 302 and also between segments 302 and 304.

The segment 302 may also include a plain text message that is displayed if the participant does not have the capability to display regions 310 and 313 of segment 304, described below, according to the multipart/alternative message type indicated in the headers 300. For example, the segment 302 can include a command instructing a participant that he or she may view a web page corresponding to the segment 304.

The segment 304 may include a rich text HTML document, including any number of dynamic regions 310, HTML forms 311, static HTML content regions 312, and IFRAME/ILAYER regions 313. The dynamic content region 310 can include, a command to dynamics content 320 of the zaplet, stored remotely such as in the database 10 of the server 6 on the network 5. The IFRAME/ILAYER region 313 may include a command to access dynamic content 321 of the zaplet, stored remotely such as in the database 10 or at the server 6 on the network 5. The dynamic content 321 may be in the same location as the first dynamic content 320, or may be in a different location in database 10. Each dynamic content region 310 and 313 may have content that includes more than one dynamically updated construct or image.

The form 311 can be used to receive input from a participant, and the region 312 can be used to provide static information/processes that are independent of the current zaplet process.

The segment 304 may also include a region 330 that can be used to store a command indicating a web page storing the content of the segment 304. This configuration can be used when a participant attempts to forward the zaplet to another participant connected to a server that cannot support the segment 304. In this way, the participant can still view the content of segment 304, and is therefore not dropped from the group.

In FIG. 4, a MIME separator 305 is configured between the segment 304 and a segment 306.

The segment 306 can include MIME encoded image data to be displayed in the HTML message of segment 304. The image data may include images for logos or photos that can be accessed by the participant even if the server 6 is not accessible. The optional segment 306 is followed by a MIME separator 307.

The present inventors have discovered that the structure 350 can be used to provide a high quality of service to various classes of participants based upon their e-mail client application capabilities. Five classes of "e-mail clients" include new P.C. e-mail clients, web e-mail clients, older P.C. e-mail clients, text e-mail clients, and America On-Line ("AOL") e-mail clients. The functionality in the segment 304 is provided to new P.C. e-mail clients completely. Some web e-mail clients do not allow use of an IFRAME/ILAYER tag to display dynamic content 321 of the dynamic content region 313. In this case, the participant gets a static message directing the participant to a web representation, or a dynamic image displaying the same up-to-date data is served by the image server 28. Many older P.C. e-mail clients, and all of the text e-mail clients cannot display the segment 304. These participants may receive an e-mail message with static content, and a URL identifying a web page at which the dynamic content may be accessed. Current AOL clients support some of the HTML standard.

It has also been found that the server 6 can be configured to identify the capability of a participant. For example, the server 6 can be configured to automatically send the zaplet to the participant by recognizing the suffix "aol.com" in the participant's network address. Alternatively, the participant can specify which e-mail client to use by sending a request to the server 6.

Figure 5:
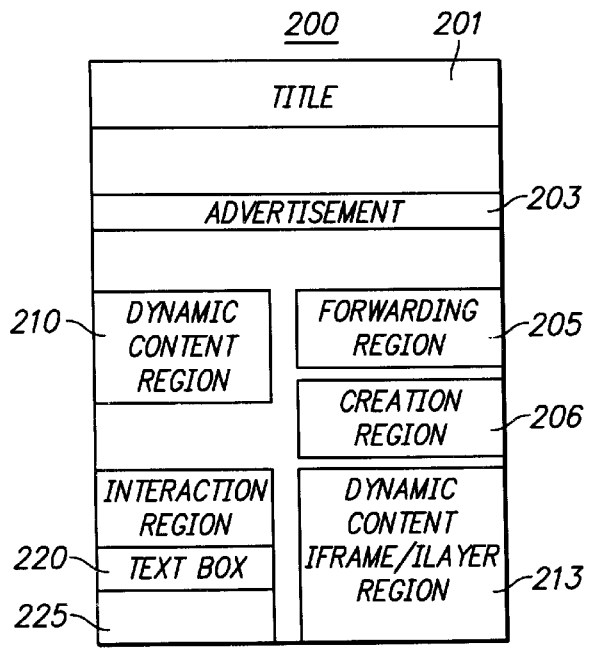
FIG. 5 is an example of an image of a zaplet.

FIG. 5 shows an example of an image of a zaplet, 200 that is displayed to a user when the data structure 350 is parsed. The zaplet may include a title field 201 that contains static content similar to the information inputted in fields 101, 102, 104, and 105. Preferably, the above static content is displayed each time the zaplet 200 is accessed by a participant. The zaplet 200 may also include an advertising region 203. The content in region 203 can be static or dynamic content. The content in regions 201 and 203 can be configured and supplied by the business logic in web application server 14.

The zaplet 200 also includes a forwarding region 205 and a creation region 206 corresponding to segment 312 of the data structure 350. The region 205 allows a participant to add an address of a potential participant that is not listed in the address field 103. This means that any participant listed in the address list of field 103 can include any other potential participants not listed in the field 103. In other configurations, the ability of a participant to add another participant can be controlled by the creating participant of the zaplet.

The creation region 206 is also included in zaplet 200 to allow a participant to create an electronic form similar to electronic form 100 to initiate another zaplet process.

The zaplet 200 also includes a dynamicfcontent region 210 corresponding to segment 310 of data structure 350 that receives the dynamic content 320. In one configuration, region 210 may include a graphical image, such as a pie chart, or other binary content including executable content. The content 320 of the region 210 can be dynamically updated by the business logic residing in the web application server 14.

The zaplet 200 also includes an interaction region 225 corresponding to segrment 312 of the data structure 350. The interaction region can include images, such as check boxes, to select options created using the electronic form 100. For example, a poll can be initiated in electronic form 100 and the interaction region 225 could contain boxes to select a poll choice. The interaction region also contains a text box 223 that allows a participant to add a text passage to the zaplet. The interaction region may also include the name of the responding participant and his or her associated e-mail address.

A dynamic content region 213 corresponding to region 313 of data structure 350 is contained in zaplet 200 that receives the content 321. The content 321 can include text passages that are entered by participants using the interaction region 225. The business logic at the web application server 14 manages the text passages and causes changes to the variables in database 10 to update the content 321 and to display the updated content in region 213, when the participant opens the message. The displayed content in region 213 may include visual images, a list of participants who have entered text passages, or any other relevant dynamic content.

Figures 6, 7:
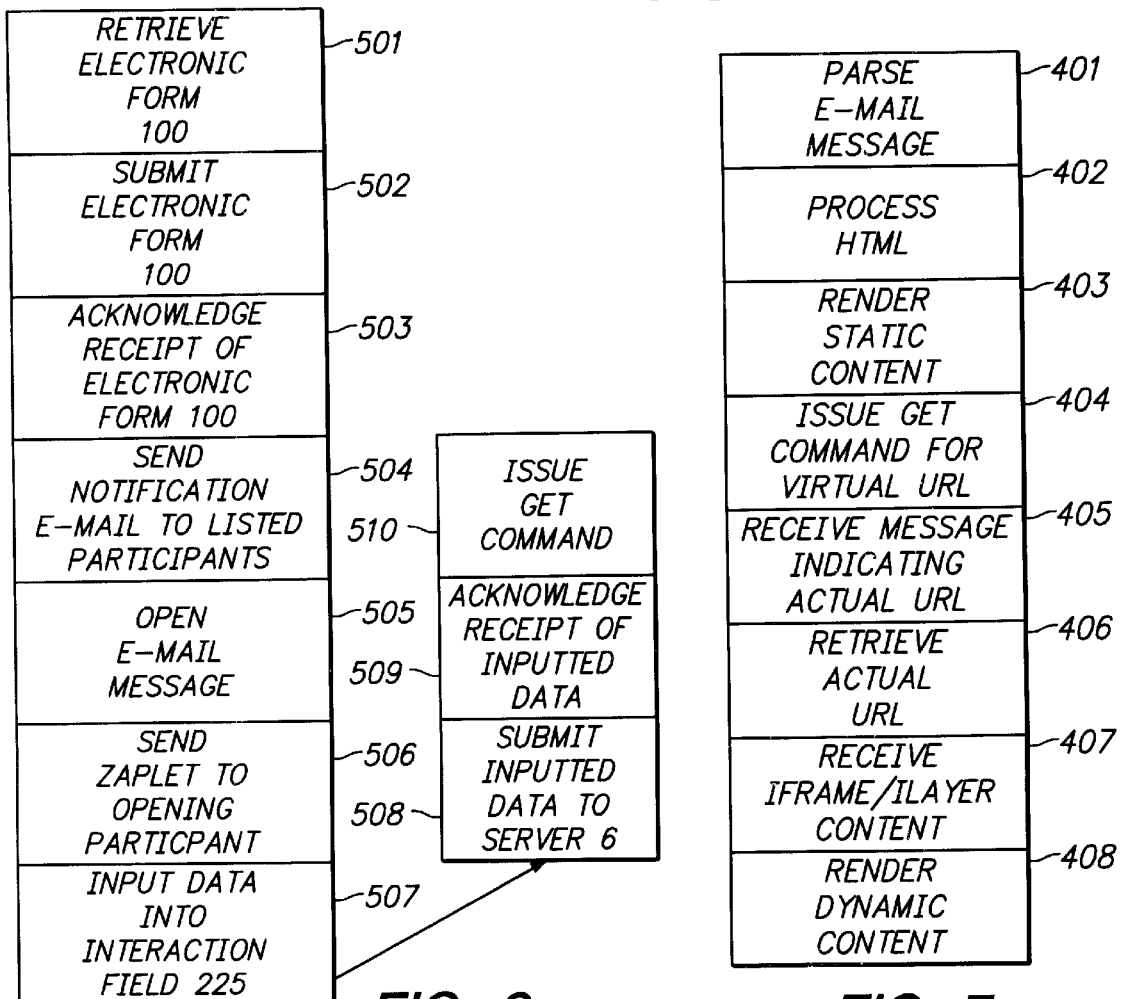
FIG. 6 is a flow chart illustrating a preferred method of the present invention.
FIG. 7 is a flow chart illustrating a preferred method of accessing the zaplet by parsing the data structure of FIG. 4.

FIG. 6 is a flow chart of a preferred method of the invention. Initially, one of the participants accesses a live electronic form 100 to begin a zaplet process (step 501). The requesting participant may access the form 100 from the database 10 via the web server 16, from a web site, or other resource as discussed above. To access the electronic form 100, the participant may specify a descriptor, such as a URL, associated with the electronic form 100. Once the electronic form 100 is displayed to the participant, the participant completes the fields 101, 102, 103, and 104. The participant may also complete field 105. The participant then submits the form to the server 6 (step 502).

Next, a confirmation message is sent from the web server 16 indicating that the content of the electronic form 100 was received, that the electronic form 100 was sent to the addresses listed in field 103, and any other errors associated with the processing of the electronic form 100 (step 503). Alternatively, the creating participant of the electronic form 100 may receive the e-mail message (step 504) described below as an acknowledgement that the form 100 was successfully received by the server 6.

Each of the participants in the list in field 103 receives an e-mail message associated with the zaplet (step 504) indicating that the zaplet process has been initiated. Next, a receiving participant opens the message (step 505). In one configuration, a receiving participant may be the creating participant. This mechanism could allow a creating participant to create a "personal" zaplet that only he or she could update or retrieve. Once the receiving participant opens the e-mail message, the dynamic content of the zaplet 200 is served essentially at viewing time to the display of the participant as follows (step 506).

Referring to FIG. 7, the e-mail protocol residing at the participant begins by parsing the received e-mail according to the MIME and SMTP header and separators 300 (step 401). If the participant is capable of displaying the dynamic content of the zaplet in the segment 304, content is produced by parsing the HTML (step 402). The participant initially renders static components of the zaplet, such as in the regions 311 and 312 (step 403). To render the dynamic content in region 310, a parsing engine at the participant issues a get command using, for example, a virtual URL identified by a tag field in the HTML (step 404). The server 6 includes logic, such as business logic in web application server 14, to map the virtual URL to an actual URL for the dynamic content 320 of the dynamic content region 310, and returns a message indicating the actual URL for the dynamic content 320 corresponding to the virtual URL, which is received at the participant site (step 405). A get command for the actual URL is then issued (step 406). A web page indicated by the IFRAME/ILAYER region 313 of the data structure 350 can also be retrieved similar to steps 404–406 (step 407), and then the dynamic content 321 for the dynamic content region 313 is rendered (step 408).

Referring again to FIG. 6, once the zaplet 200 is retrieved by the participant, he or she inputs data into the interaction region 225 (step 507). For example, the user may input a text passage. At this stage, the dynamic content region 213 will include concatenated text messages and a list of message recipients as discussed above. The participant then submits the updated zaplet to the server 6 (step 508). Next, the submitting participant receives an acknowledgement from the web server 16 indicating that the zaplet was received (step 509). The e-mail protocol residing at the client may then issue at any time a new get command for the dynamic content in region 310 and/or region 313 to display the updated images and/or text content in the dynamic content regions 210 and 213 (step 510). Alternatively, after the participant submits his or her input (step 508), another instance of the zaplet could be served that includes the above acknowledgement, and also reflects the most recent dynamic content including the submission at step 508. In another configuration, the dynamic content of the zaplet could be updated "in-place". This means that the regions 210 and 213 could be updated to reflect the most recent content in the server 6 including the submission at step 508, as the participants viewing the zaplet. Subsequent actions by any of the participants of the group to open a message will result in the display of the updated images and text content in the zaplet 200.

The preferred method permits participants to collaborate efficiently. Each participant can send and receive information that is current using dynamic regions 210 and 213. This means that participants can accurately respond or opine to a zaplet process with the most current information at their disposal.

The preferred method supports privacy and communications because the dynamic content can be restricted to those specified in field 103. Further, the preferred method and system allows content to be dynamically updated asynchronously relative to the sending of the documents or forms and asynchronously relative to any processes used by any other participants parsing the electronic messages. In this way, the zaplets received by participants of the group do not become stale or outdated. Additionally, the updated content includes dynamic information identifying changes that have occurred since the message was last viewed by the viewing participant. This means that the viewing participant can track the opinions, suggestions, or other comments made by other participants in a simple and quick manner. The preferred method also allows participants to interact with other participants in a group without the daunting task of "surfing" the Web to find the discussion management tool that manages the discussion. The preferred method and system also provides the highest quality service based upon the participant's e-mail application capabilities.

The present inventors have discovered that the above-described preferred methods and systems can be used to ensure that the content (e.g., static or dynamic) is accurately and precisely transmitted between the participant and the server 6. Further, the preferred methods and systems are able to support the efficient transmission of the content to minimize the data size of the transmission. Moreover, the preferred methods and systems can be used to limit or prevent unauthorized use of the server 6 by unwanted entities, such as third party operators or sources (e.g., web search engines). Accordingly, the preferred methods and systems can be configured to support the secure, reliable, and efficient transmission of information between the participants and the server 6.

In a preferred configuration, the server 6 is configured with logic to encode and decode a link identifier, such as a URL, that is associated with the then current dynamic content of the electronic medium that is stored in the database 10. The preferred configuration uses an encoding and decoding process and a "redirection process" that limits the load on the database 10 by accessing only changed states of the information, not the entire set of information as in known systems. The redirection process uses a redirection message string that can be easily cached. For each new request for information by any of the participants, the redirect message string can be used to direct the participant to, for example, the image server 28. In this way, the number of communications to the database can be significantly reduced.

An example of a process for transmitting content between the participants and the image server 28 is as follows. The content may be any graphical image, or other binary content, as described above. Initially, the participant opens the electronic message (step 505) generated by the server 6. Next, the e-mail protocol residing at the participant executes the steps 401–403 described above.

In one configuration, the electronic message may be an IMG (image) tag in an HTML-encoded message containing a URL or other link identifier having a message ID. The participant may retrieve the content associated with the link identifier by executing the step 404. The message ID is generally a unique code associated with the HTML message that is generated at the time the message is sent (step 505). The message ID allows any participant to uniquely identify the content associated with the message. The participant may then receive the actual URL associated with the requested content as follows.

Further details of logic for executing an exemplary encoding and redirect process, described below, configured in pseudocode executable by the system and describing the method of the present invention for transmitting information to participants can be found in attached Appendix B.

Figure 8:
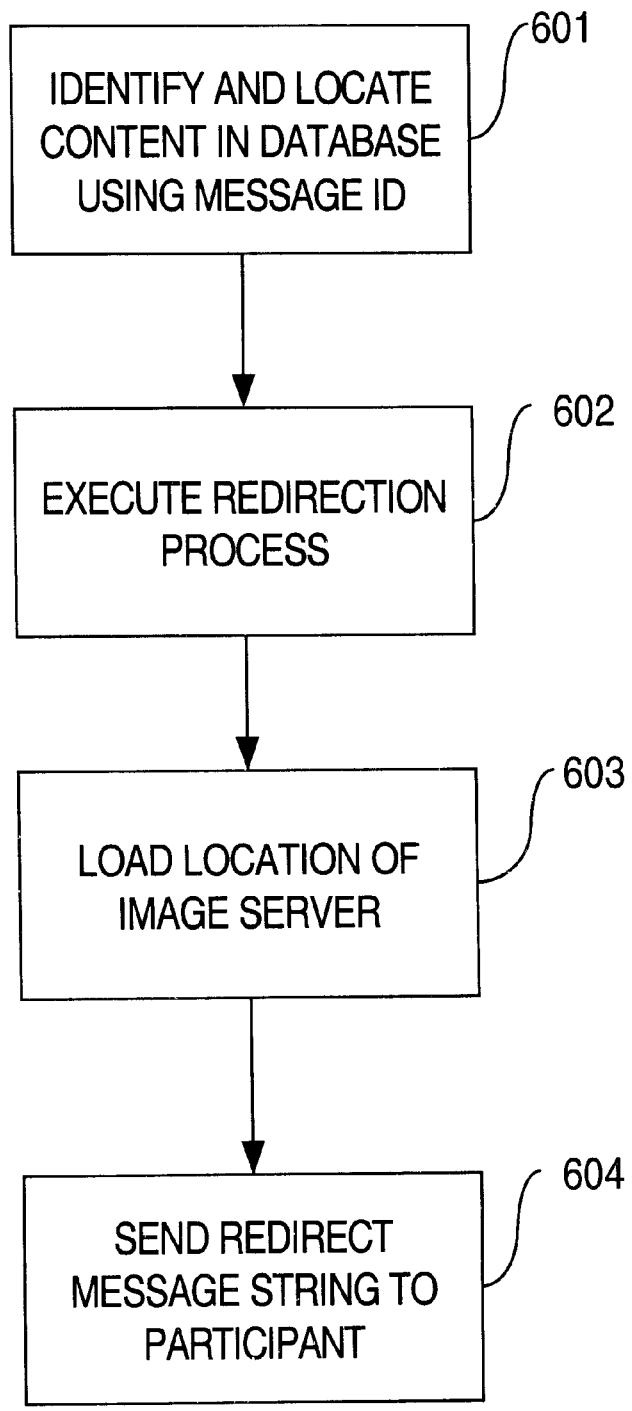
FIG. 8 shows a flow chart of a process of requesting information from the server of FIG. 2.

As shown in FIG. 8, the server 6 identifies and, locates the content in the database requested by the participant using the message ID (step 601). At this stage, the server executes the preferred redirection process as follows (step 602).

Figure 9:
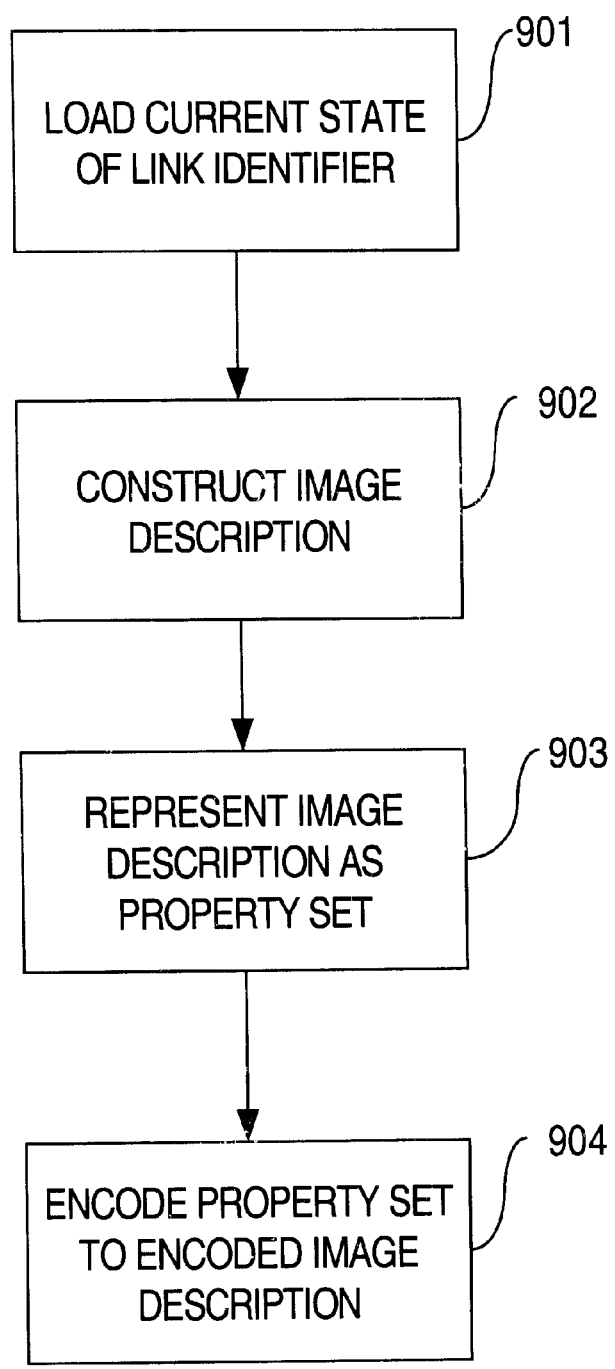
FIG. 9 shows a flow chart of a process of encoding a data set associated with the information of FIG. 8.

FIG. 9 illustrates a flow diagram of the preferred redirection process. Once the server 6 receives the message ID at step 404, the server 6 loads the current state of the link identifier from the database (step 901). The server 6 then executes logic in the web application server 14 to extract relevant data about the message from the database to construct the requested content, e.g., an image (step 902). In this configuration, the link identifier may be an image description. The image description may include details such as image type, optional size, optional presentation information (e.g., color), and other information identifying the content to be retrieved. The image is then represented as a property set (step 903). For example, the property set can be constructed as "image type=pie, options=(red, blue, yellow), votes=(3, 2, 1)." In this example, the property set corresponds to a request by a participant for the then current state of a pie chart display that identifies quadrants for votes (e.g., a poll) in red, blue, and yellow. Next, the property set is encoded to construct an encoded image description (step 904).

Figure 10:
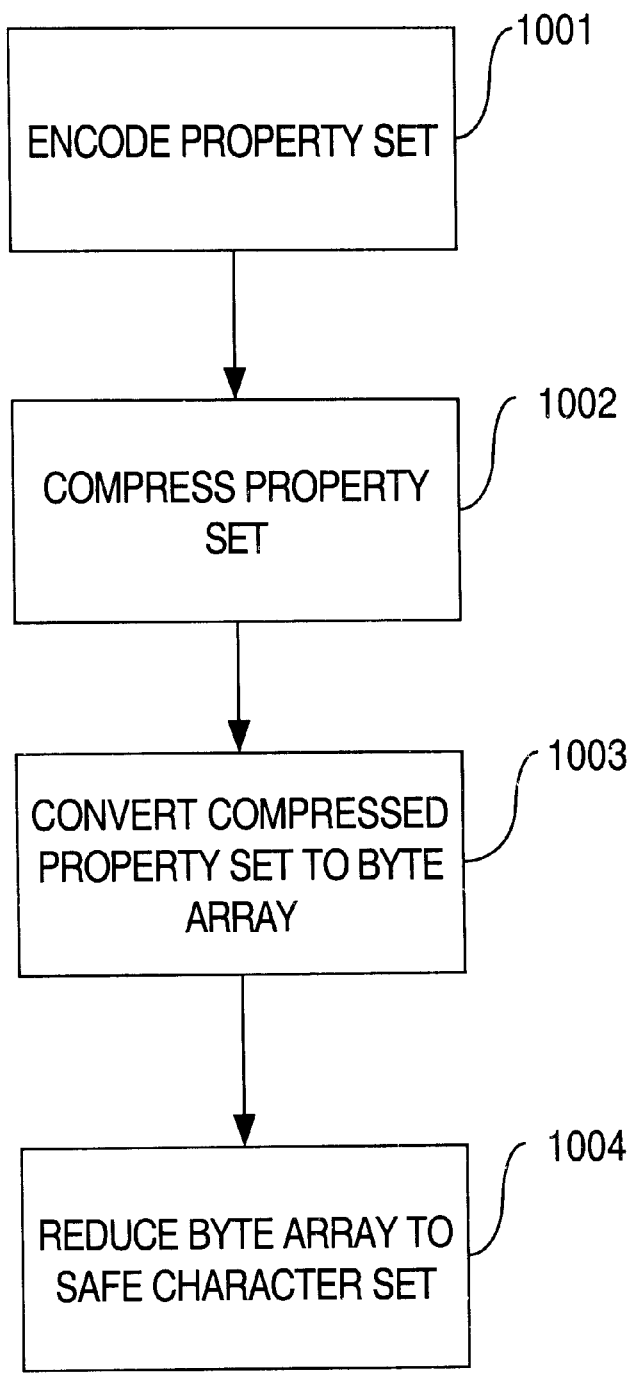
FIG. 10 illustrates a process of redirecting a request for information to the server of FIG. 2.

FIG. 10 illustrates a flow diagram of a preferred encoding process to achieve the encoded image description. In one configuration, the image description can be encoded in a portable ASCII-based encoding technique. This ensures accurate transmission of the image description through any standard web browser or proxy. The resulting encoding may include information about the requested image by the participant. The information may include width, height, color, pattern, presence or absence of a legend, current state of the dynamic content (e.g., polls, schedules) or names of participants identified in the electronic form (e.g., electronic form 100).

Initially, the property set is encoded to support the e-mail protocol transmitting the request (step 1001) to the server 6. In one configuration, the string may be a HTTP transmittable text string. The image description may be encoded into the property set using standard HTTP argument-value encoding. In one embodiment, any illegal characters may be stripped and substituted with an escape character (e.g., "%") and ASCII hex code values for the illegal character values.

The property set is then compressed using standard text compression techniques (step 1002), such as Huffman encoding, to create a compressed string. The compressed string may then be converted to a byte array (step 1003) to obscure the compressed string. The step 1003 may be performed using any transformation scheme known to one or more of the participants requesting the content, such as byte-order scrambling, or encryption. For example, to obscure data at the step 1003, the compressed string can be converted to an array of seven-bit values, prefixed with a two-byte length value. This means that the property set can be treated as a contiguous array of 8-bit values, splitting the array every seven bits to create a new value array that is (8/7) times as long as the initial property set. The bytes of the compressed string may then be additionally obscured. This can be done by "rotating" the higher order bits of each byte. The rotation may be performed by moving the top four bits of each byte to its "lower" neighbor, rotating the lowest value around to the top four bits of the last item in the array.

Referring again to FIG. 10, the byte array at the step 1003 may then be reduced to a set to fit into a safe character set (step 1004), such as the ASCII values "A–Z," "a–z," "/," and ",". For example, the byte array can be converted to an array of six-bit values, prefixed with a two-byte length value encoding using a known multiple. In this way, the byte array can be treated as a contiguous array of 8-bit values that is split every six bits to create a new value array that is (8/6) times as long as the byte array of step 1003. The newly formed byte array may then be mapped into a 64-element-long string of safe ASCII values. The safe values are used in many standard HTTP encodings and can advantageously not be manipulated by a user agent or proxy prior to transmission.

Referring again to FIG. 8, the location of the image server is then loaded from the internal application memory of the web application server 14 (step 603). Next, a redirect message string is sent to the participant (step 604). The redirect message string is constructed using the redirection process described above. The redirect message string may be an HTTP message of the form "http://<image server location>/<encoded image data>." In this example, "image server location" is the domain name of an Internet-addressable server that contains the image generation application and "encoded image data" is the image definition in the form of a property set that is processed using the steps 1000–1005 described above.

Figure 11:
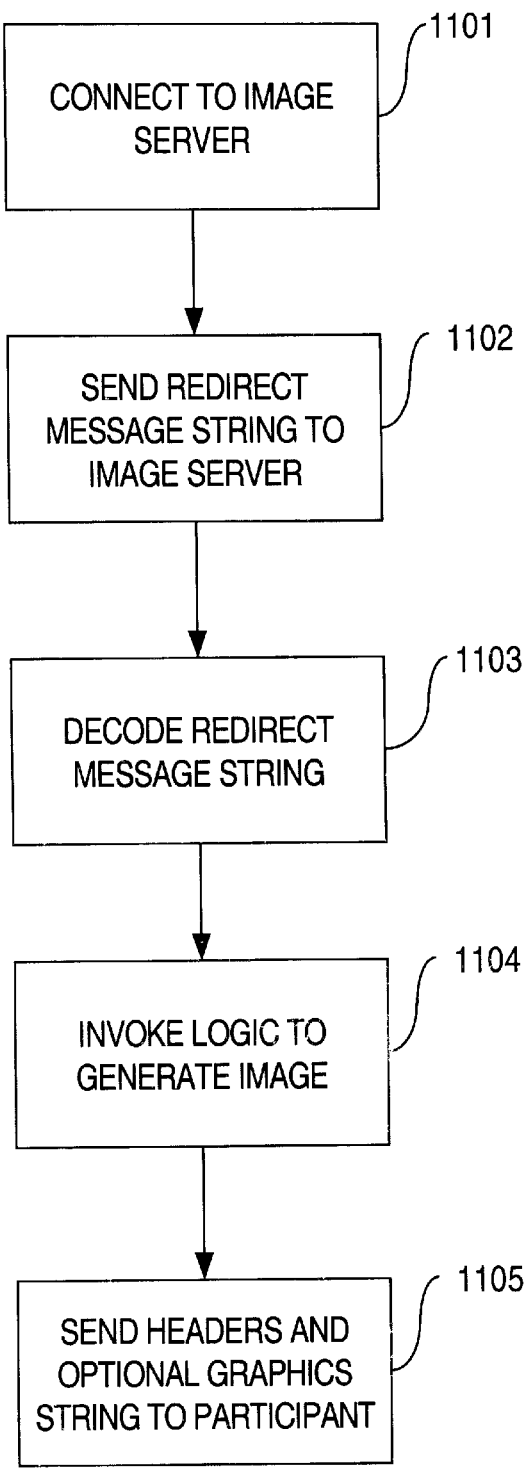
FIG. 11 illustrates a process of retrieving data from an image server.

The get command at the step 406 to retrieve the image data (step 407) can be issued as follows. As shown in FIG. 11, the participant connects to the image server 28 (step 1101). Next, the participant sends the redirect message string (step 604) to the image server (step 1102).

Once the image server receives the redirect message string, the string is decoded by reversing the encoding process of FIG. 10 (step 1103). Based on the image type specified in the property set, logic in the image server may be invoked to generate the required image (step 1104). Additionally, the logic in the image server may also determine an optimal width and height for the image. The image server database may also be filled with a byte pattern corresponding to a color image to be displayed in the dynamic content regions. In this case, a graphic encoding process may be applied to the byte pattern to create a string of bytes representing the image in one of many known formats. Suitable graphic encoding techniques include JPEG, GIF, or PNG. After the graphics encoding is performed, headers describing the size and format of the image to be displayed coupled with the generated graphics string may then be sent to the participant (step 1105). The step 408 may then be executed by interpreting the headers and the graphics string.

Subsequent requests by any of the participants for the most current state of the content identified from a prior image description will be sent to the server 6. Each time a new request is made by any of the participants, the preferred redirect message string can be used to retrieve the updated or then current from the image server 28 without having to serve the entire image to the participant, as in known systems. This is because the redirect message string is small and can be easily cached at the participant or in the server 6. When a new image description is requested the image description can be easily compared to the cached redirect message. A request to the image server 28, which causes a new image to be created and served, is only made when the participant receives an image description in the redirect message string that is different from a previous image description. In this way, the redirect message string avoids unnecessary, redundant, and costly communication with the database.

The preferred encoding and decoding and redirection process to transmit information to the participants from the server is reliable, efficient, and secure. The redirection process uses the redirection message string to send a new link identifier to the participant for each change in content or information. This means that the participant is notified that the information cached locally must be updated. This allows the information viewed or accessed by the participant to be always current. The encoding is used to ensure that the information is properly delivered through the systems using standard HTTP character sets. The conversion to a safe character set can be used to obscure the produced redirect message. This makes reproduction and unwanted access to the server 6 difficult. Further, the compression of the property set into a compressed string allows the information to be transmitted more accurately and quickly. This is because more characters can be used to describe the information to be transmitted using the limited character bandwidth of standard HTTP browsers. For example, some browsers can only support 256-byte data strings. Using the encoding and compression techniques described above, approximately 400 bytes of data may be sent using a standard 256-byte data string. In this way, content can be precisely defined because of the increased string capability.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention. For example, variations in the specification of which e-mail protocol a particular participant supports can be sent by the participant to the server 6 so that a different message format based on that knowledge can be forwarded to the participant. Accordingly, other embodiments are within the scope of the following claims.

APPENDIX A

```
1 Deliver Electronic (Authoring) Form
get ZAPLET_TYPE, ZAPLET_STYLE from request
open file ELECTRONIC_FORM for writing
write Creating_Participant_Input_Field(ZAPLET_TYPE, ZAPLET_STYLE) to
ELECTRONIC_FORM
write Creating_Participant_Email_Input_Field(ZAPLET_TYPE, ZAPLET_STYLE) to
ELECTRONIC_FORM
write Subject_Input_Field(ZAPLET_TYPE, ZAPLET_STYLE) to ELECTRONIC_FORM
write Recipients_Input_Field(ZAPLET_TYPE, ZAPLET_STYLE) to
ELECTRONIC_FORM
write Zaplet_Specific_Data_Input_Fields(ZAPLET_TYPE, ZAPLET_STYLE) to
ELECTRONIC_FORM
write Zaplet_Type_Constant(ZAPLET_TYPE, ZAPLET_STYLE) to
ELECTRONIC_FORM
write Zaplet_Style_Constant(ZAPLET_TYPE, ZAPLET_STYLE) to
ELECTRONIC_FORM
write Static_Form_Content(ZAPLET_TYPE, ZAPLET_STYLE) to
ELECTRONIC_FORM
open stream CLIENT for writing
write ELECTRONIC_FORM to CLIENT
2 Receive Electronic (Authoring) Form Input and Send Mail
get CREATING_PARTICIPANT_NAME, CREATING_PARTICIPANT_EMAIL,
SUBJECT,
ZAPLET_TYPE,
    ZAPLET_STYLE, ZAPLET_SPECIFIC_DATA, RECIPIENTS from request
set MESSAGE_ID = create_unique_id()
open file MESSAGE for writing
create (Message_Record(MESSAGE_ID, CREATING_PARTICIPANT_NAME,
CREATING_PARTICIPANT_EMAIL,
    SUBJECT, ZAPLET_TYPE, ZAPLET_STYLE, ZAPLET_SPECIFIC_DATA,
RECIPIENTS)) in
database
write MESSAGE_ID, CREATING_PARTICIPANT_NAME,
CREATING_PARTICIPANT_EMAIL,
    SUBJECT, ZAPLET_TYPE, ZAPLET_STYLE, ZAPLET_SPECIFIC_DATA,
RECIPIENTS to
MESSAGE
if (User_Record(CREATING_PARTICIPANT_EMAIL) not_exists_in database){
    create User_Record(CREATING_PARTICIPANT_EMAIL,
CREATING_PARTICIPANT_NAME)
in database
}
foreach (USER_EMAIL in RECIPIENTS){
    if (User_Record(USER_EMAIL) not_exists_in database){
        create User_Record(USER_EMAIL) in database
    }
}
foreach (QUESTION in request) {
    set QUESTION_ID = create_unique_id()
    get QUESTION_CONTENT from request
    write QUESTION_ID, QUESTION_CONTENT to MESSAGE in database
    foreach (CHOICE in QUESTION) {
        set CHOICE_ID = create_unique_id()
        write CHOICE_ID, CHOICE to MESSAGE
    }
}
open file MAIL for writing
write (Transport_Headers(MESSAGE)) to MAIL
write ("From:" + Creating_Participant(MESSAGE)) to MAIL
write ("To:" + Recipients(MESSAGE)) to MAIL
write ("Subject:" + Subject(MESSAGE)) to MAIL
write (Encoding_Headers(MESSAGE)) to MAIL
write (ENCODING_SEPARATOR) to MAIL
write (PLAIN_TEXT_ENCODING_LABEL) to MAIL
write (Plain_Text_Static_Portion(MESSAGE)) to MAIL
write (URL(MESSAGE)) to MAIL
write (ENCODING_SEPARATOR) to MAIL
write (RICH_TEXT_ENCODING_LABEL) to MAIL
write (Rich_Text_Static_Portion(MESSAGE)) to MAIL
foreach (QUESTION in MESSAGE) {
    write (Interaction_Form(QUESTION)) to MAIL
    write (Static_Portion(QUESTION)) to MAIL
    write (Dynamic_Image_Portion(QUESTION)) to MAIL
    write (IFRAME_ILAYER_Portion(QUESTION)) to MAIL
    write (IFRAME_ILAYER_Alternative_Portion(QUESTION)) to MAIL
}
write (ENCODING_SEPARATOR) to MAIL
if (SUPPORT_IMAGE_DATA)
    write (Image_Data(MESSAGE)) to MAIL
```

APPENDIX A-continued

```
open stream TRANSPORT_SERVER for writing
write MAIL to TRANSPORT_SERVER
open file REPLY for writing
write Confirmation_Message(MAIL) to REPLY
open stream CLIENT for writing
write REPLY to CLIENT
3 Serve Dynamic Rich-Text Contents
get MESSAGE_ID from request
load MESSAGE by MESSAGE_ID from database
open file REPLY for writing
foreach (QUESTION in MESSAGE) {
    write (Format_Dynamic_Portion(QUESTION)) to REPLY
    foreach (RESPONSE in QUESTION){
      write (Format_Dynamic_Portion(RESPONSE)) to REPLY
    }
}
open stream CLIENT for writing
write REPLY to CLIENT
4 Serve Dynamic Image Contents
get MESSAGE_ID, QUESTION_ID from request
load QUESTION by QUESTION_ID from database
open file IMAGE for writing
write (Format_Image(QUESTION, Summarize(Responses(QUESTION)))) to IMAGE
open stream CLIENT for writing
write IMAGE to CLIENT
5 Receive Response Form Input
get MESSAGE_ID, QUESTION_ID, RESPONDER_NAME, RESPONDER_EMAIL,
COMMENT,
    QUESTION_SPECIFIC_INFO from request
if (User_Record(RESPONDER_EMAIL) not_exists_in database){
    create User_Record(RESPONDER_EMAIL, RESPONDER_NAME) in database
}
if (Allowed_To_Respond(RESPONDER_EMAIL, QUESTION){
    create_or_update Response_Record(MESSAGE_ID, QUESTION_ID,
RESPONDER_EMAIL,
COMMENT, QUESTION_SPECIFIC_INFO) in database
}
open file REPLY for writing
get MESSAGE by MESSAGE_ID from database
write (Confirmation_View(MESSAGE)) to REPLY
open stream CLIENT for writing
write REPLY to CLIENT
6 Resend or Forward Message
get MESSAGE_ID, NEW_RECIPIENT_EMAILS from request
foreach (USER_EMAIL in NEW_RECIPIENT_EMAILS){
    if (User_Record(USER_EMAIL) not_exists_in database){
      create User_Record(USER_EMAIL) in database
    }
}
get MESSAGE by MESSAGE_ID from database
set Recipients(MESSAGE) = Recipients(MESSAGE)+NEW_RECIPIENT_EMAILS
update Message_Record(MESSAGE) in database
open file MAIL for writing
write (Transport_Headers(MESSAGE)) to MAIL
write ("From:" + Creating_Participant(MESSAGE)) to MAIL
write ("To:" + NEW_RECIPIENT_EMAILS) to MAIL
write ("Subject:" + Subject(MESSAGE)) to MAIL
write (Encoding_Headers(MESSAGE)) to MAIL
write (ENCODING_SEPARATOR) to MAIL
write (PLAIN_TEXT_ENCODING_LABEL) to MAIL
write (Plain_Text_Static_Portion(MESSAGE)) to MAIL
write (URL(MESSAGE)) to MAIL
write (ENCODING_SEPARATOR) to MAIL
write (RICH_TEXT_ENCODING_LABEL) to MAIL
write (Rich_Text_Static_Portion(MESSAGE)) to MAIL
foreach (QUESTION in MESSAGE) {
    write (Interaction_Form(QUESTION)) to MAIL
    write (Static_Portion(QUESTION)) to MAIL
    write (Dynamic_Image_Portion(QUESTION)) to MAIL
    write (IFRAME_ILAYER_Portion(QUESTION)) to MAIL
    write (IFRAME_ILAYER_Alternative_Portion(QUESTION)) to MAIL
}
write (ENCODING_SEPARATOR) to MAIL
if(SUPPORT_IMAGE_DATA)
    write (Image_Data(MESSAGE)) to MAIL
open stream TRANSPORT_SERVER for writing
write MAIL to TRANSPORT_SERVER
open file REPLY for writing
write Confirmation_Message(MAIL) to REPLY
```

APPENDIX A-continued open stream CLIENT for writing
write REPLY to CLIENT

APPENDIX B

Message is sent to client containing a URL of the form:
http://www.company.com/imageRedirect?id= 12345
(where id is a unique Message ID associated with the message that was sent).
Client opens a request to the machine at www.company.com and sends a request
for "/imageRedirect?id=12345". This machine then executes code functionally
identical to:

```
HANDLE_REDIRECT_REQUEST
{
msgData = loadMessageFromDatabase(id)
imageType = msgData.getImageType()
imageColor = msgData.getImageColor()
imageOptionList = msgData.getOptionList()
imageCurrentStatus = msgData.getCurrentStatus()
imageData = new PropertySet
imageData{imageType} = imageType
imageData{imageColor} = imageColor
imageData{imageOptionList} = imageOptionList
imageData{imageCurrentStatus} = imageCurrentStatus
encodedStr = ENCODE(imageData)
imageServerHostName = loadImageServerHostName()
sendRedirectToClient(imageServerHostName + encodedStr)
}
ENCODE(PropertySet props)
{
    propertyString = encodePropertiesAsHTTPString(props)
    compressed = compressString(propertyString)
    sevenBit = splitStringToSevenBitChunks(compressed)
    byteArray = encryptArray(sevenBit)
    safeChars = mapByteArrayTo64BitASCII(byteArray)
    return safeChars
}
```

On receipt of the encoded request, the image server performs:

```
HANDLE_IMAGE_REQUEST
{
    imageProperties = DECODE(inputArgument)
    theImage = createImage(imageProperties)
    streamImageDataToNetwork(theImage)
}
DECODE(String encodedArgs)
{
    byteArray = map64BitASCIIToByteArray(encodedArgs)
    sevenBit = decryptArray(byteArray)
    compressed = reassembleFromSevenBitChunks(evenBit)
    propertyString = uncompressString(compressed)
    properties = decodeHTTPStringToProperties(propertyString)
    return properties;
}
```

What is claimed is:

1. A method for transmitting information over a network, comprising:

receiving a link identifier associated with a file containing the information;

executing a first command to retrieve the link identifier;

converting the link identifier to a property set;

encoding the property set;

generating a redirect message string from the property set; and accessing the file using values from the redirect message string for each change of the link identifier.

2. The method of claim 1, wherein the information comprises one of static and binary content.

3. The method of claim 1, wherein the receiving step further comprises:

receiving a virtual link identifier in an electronic message; and parsing the electronic message to execute the first command.

4. The method of claim 1, wherein the link identifier is a Universal Resource Locator.

5. The method of claim 1, wherein the accessing step further comprises caching the redirect message string and comparing the link identifier to the redirect message string.

6. The method of claim 1 wherein the link identifier comprises a message ID.

7. The method of claim 6, wherein the converting step further comprises loading a current state of the link identifier as an image description from the message ID.

8. The method of claim 3, wherein the electronic message is an HTML encoded message.

9. The method of claim 1, wherein the encoding step further comprises encoding the property set using ASCII-based encoding.

10. The method of claim 1, wherein the encoding step further comprises compressing the property string and obscuring the compressed property string.

11. The method of claim 10, wherein the obscuring step further comprises mapping the obscured compressed property string into a set of safe character values.

12. The method of claim 1, wherein the accessing step further comprises decoding the redirect message string and retrieving the file from a server.

13. The method of claim 12, wherein the retrieving step further comprises generating an image from values in the redirect message string.

14. The method of claim 11, wherein the safe character values further comprise ASCII values.

15. The method of claim 1, wherein the link identifier is configured for use with one of an electronic mail and Internet protocol.

16. A method for transmitting information over a network, comprising:
   receiving a link identifier in an electronic message, the link identifier being associated with a file containing the information;
   parsing the electronic message;
   executing a first.command to retrieve the link identifier;
   converting the link identifier to a property set;
   encoding the property set, the property set being encoded into a safe character set;
   generating a redirect message string from the property set; and
   accessing the file using values from the redirect message string for each change of the link identifier.

17. A network system for transmitting information among a group of participants, comprising:
   a server for generating and sending a link identifier associated with a file containing the information to a participant, the server further comprising an interface responsive to a first command to retrieve the link identifier;
   a web application server for converting the link identifier to a property set, the web application server further comprising logic to encode the property set and to generate a redirect message from the property set; and
   an image server for accessing the file using values from the redirect message string for each change of the link identifier.

18. The network system of claim 17, wherein the information comprises one of static and binary content.

19. The network system of claim 17, wherein the link identifier is a Universal Resource Locator.

20. The network system of claim 1, wherein the redirect message string is cached in one of the participant and the server.

21. A method of efficiently communicating information among participants in a group, comprising the computer-implemented steps of:
   generating an electronic medium comprising one or more link identifiers, wherein each of the link identifiers is associated with corresponding dynamic content stored in a data store;
   receiving a request to retrieve the dynamic content using the one or more link identifiers;
   encoding the one or more link identifiers as one or more corresponding message strings;
   generating a redirection response that includes the one or more corresponding message strings;
   providing the redirection response to a client;
   receiving a request to retrieve one or more image elements of the dynamic content using the message strings;
   decoding the message strings to result in identifying one or more actual locations of the image elements; and
   providing the image elements to the client as part of the dynamic content.

22. A method as recited in claim 21, wherein the electronic medium comprises an HTML-encoded electronic mail message, and wherein at least one of the link identifiers comprise an image tag associated with a universal resource locator that comprises a message identifier.

23. A method as recited in claim 21, wherein the electronic medium comprises an HTML-encoded electronic mail message, and wherein at least one of the link identifiers comprise an image tag associated with a universal resource locator that comprises a message identifier that is generated when the message is sent and that uniquely identifies the dynamic content.

24. A method as recited in claim 21, wherein the steps of encoding the one or more link identifiers further comprise the steps of:
   determining a then-current state of the dynamic content based on the one or more link identifiers;
   retrieving one or more image description elements based on the one or more link identifiers;
   creating and storing a set of one or more properties of a dynamic image based on the image description elements and the then-current state;
   creating and storing one or more text strings that encode the set of properties.

25. A method as recited in claim 24, wherein creating and storing one or more text strings comprises the steps of creating and storing one or more HTTP argument-value encoded text strings that may be communicated as part of an HTTP request.

26. A method as recited in claim 24, further comprising the step of transforming the one or more text strings by compressing or obscuring the text strings to result in creating or storing one or more transformed text strings.

27. A method as recited in claim 26, further comprising the step of converting the one or more transformed text strings for communication in a universal character set.

28. A method as recited in claim 24, wherein generating a redirection response comprises the steps of generating a redirect message string that identifies an image server that holds the image elements and that includes the one or more text strings.

29. A method as recited in claim 24, wherein decoding the message strings comprises the steps of:
   retrieving the image elements based on decoding the text strings;
   identifying one or more properties of the dynamic image based on decoding the message strings into the image description elements and the then-current state;
   generating a graphic image based on the retrieved image elements and the properties of the dynamic image.

30. A method as recited in claim 21, further comprising the steps of responding to one or more subsequent requests to retrieve the dynamic content of members of the group using the one or more link identifiers by providing the redirection response that includes the one or more corresponding message strings without serving an entire static image to a requesting client.

31. An apparatus for efficiently communicating information among participants in a, group, comprising:
   means for generating an electronic medium comprising one or more link identifiers, wherein each of the link identifiers is associated with corresponding dynamic content stored in a data store;

means for receiving a request to retrieve the dynamic content using the one or more link identifiers;

means for encoding the one or more link identifiers as one or more corresponding message strings;

means for generating a redirection response that includes the one or more corresponding message strings;

means for providing the redirection response to a client;

means for receiving a request to retrieve one or more image elements of the dynamic content using the message strings;

means for decoding the message strings to result in identifying one or more actual locations of the image elements; and means for providing the image elements to the client as part of the dynamic content.

32. A computer-readable medium comprising one or more sequences of instructions for efficiently communicating information among participants in a group, which instructions, when executed by one or more processors, cause the one or more processors to carry out the steps of:

generating an electronic medium comprising one or more link identifiers, wherein each of the link identifiers is associated with corresponding dynamic content stored in a data store;

receiving a request to retrieve the dynamic content using the one or more link identifiers;

encoding the one or more link identifiers as one or more corresponding message strings;

generating a redirection response that includes the one or more corresponding message strings;

providing the redirection response to a client;

receiving a request to retrieve one or more image elements of the dynamic content using the message strings;

decoding the message strings to result in identifying one or more actual locations of the image elements; and providing the image elements to the client as part of the dynamic content.

* * * * *